US009567912B2

(12) United States Patent
Prociw et al.

(10) Patent No.: US 9,567,912 B2
(45) Date of Patent: Feb. 14, 2017

(54) CONTINUOUS IGNITION SYSTEMS

(71) Applicant: Delavan Inc, West Des Moines, IA (US)

(72) Inventors: Lev A. Prociw, Johnston, IA (US); Jason A. Ryon, Carlisle, IA (US); Steven J. Myers, West Des Moines, IA (US)

(73) Assignee: Delavan Inc, West Des Moines, IA (US)

( * ) Notice: Subject to any disclaimer, the term of this patent is extended or adjusted under 35 U.S.C. 154(b) by 371 days.

(21) Appl. No.: 14/169,452

(22) Filed: Jan. 31, 2014

(65) Prior Publication Data
US 2014/0366505 A1 Dec. 18, 2014

Related U.S. Application Data

(63) Continuation-in-part of application No. 13/917,053, filed on Jun. 13, 2013, now Pat. No. 9,080,772.

(60) Provisional application No. 61/900,644, filed on Nov. 6, 2013.

(51) Int. Cl.
F02C 7/266 (2006.01)

(52) U.S. Cl.
CPC ........... *F02C 7/266* (2013.01); *F05D 2240/40* (2013.01); *F05D 2250/314* (2013.01); *F23C 2900/03005* (2013.01); *F23D 2207/00* (2013.01)

(58) Field of Classification Search
CPC ..... F02C 7/222; F02C 7/266; F05D 2250/314; F23D 2207/00
USPC ...... 60/776, 39.821, 39.826, 39.827, 39.828; 431/6, 28, 264–266, 60, 72, 255, 254
See application file for complete search history.

(56) References Cited

U.S. PATENT DOCUMENTS

| 6,298,659 | B1 | 10/2001 | Knuth et al. | |
| 9,194,402 | B2* | 11/2015 | Rohs | F01B 3/0002 |
| 2005/0208446 | A1* | 9/2005 | Jayne | F02B 23/04 |
| | | | | 431/264 |
| 2014/0080072 | A1 | 3/2014 | Smirnov et al. | |

FOREIGN PATENT DOCUMENTS

| DE | 102011018846 A1 | 7/2012 |
| EP | 1508744 A1 | 2/2005 |
| GB | 717755 A | 11/1954 |
| WO | 2007113186 A1 | 10/2007 |

OTHER PUBLICATIONS

Extended European Search Report and Opinion issued in corresponding European Application No. 14172327.0, dated Oct. 7, 2014, 6 pages.
Extended European Search Report and Opinion issued in European Application No. 14172360.1, dated Oct. 14, 2014, 6 pages.

* cited by examiner

*Primary Examiner* — Jason L Vaughan
*Assistant Examiner* — Amanda Meneghini
(74) *Attorney, Agent, or Firm* — Locke Lord LLP; Scott D. Wofsy; Christopher J. Cillié

(57) ABSTRACT

A head assembly for an ignition system includes a head block and a plurality of igniters seated in the head block. The head block has an issue aperture and defines an issue axis, and is configured and adapted for sealably coupling with an igniter combustion chamber. The igniters are arranged about the issue aperture and include respective ignition members arranged obliquely with respect to the issue axis for igniting fuel exiting the issue aperture irrespective to orientation of the ignition system.

16 Claims, 12 Drawing Sheets

*Fig. 19*
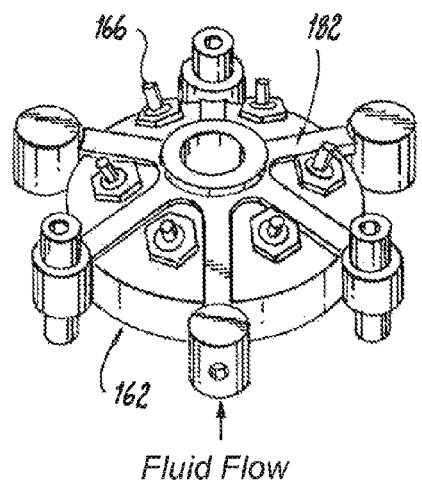
Fluid Flow
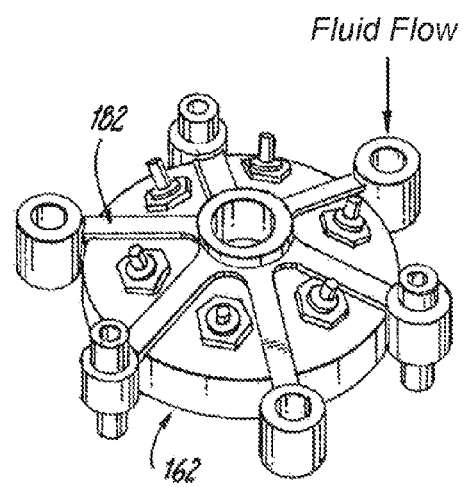
Fluid Flow
*Fig. 21*                    *Fig. 20*
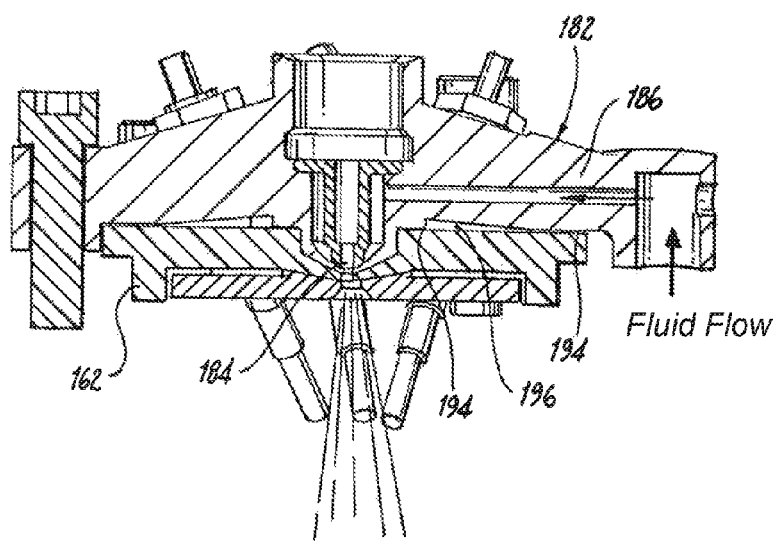
Fluid Flow

CONTINUOUS IGNITION SYSTEMS

CROSS-REFERENCE TO RELATED APPLICATIONS

This application is a continuation-in-part of U.S. patent application Ser. No. 13/917,053 filed Jun. 13, 2013, and claims priority to U.S. Provisional Patent Application No. 61/900,644 filed on Nov. 6, 2013, both of which are incorporated by reference herein in their entireties.

BACKGROUND OF THE INVENTION

1. Field of the Invention

The present invention relates to combustion, and more particularly to ignition systems such as in gas turbine engines.

2. Description of Related Art

A variety of devices are known for initiating combustion, for example in a gas turbine engine. Many gas turbine engines use spark igniters for ignition. One or more spark igniters are positioned to ignite a fuel and air mixture to initiate the flame in the combustor. These typical igniters provide ignition energy intermittently, and the spark event must coincide with a flammable mixture local to the igniter in order for engine ignition to occur. Often this means fuel will be sprayed toward the combustor wall near the igniter to improve the chances of ignition. This increased concentration of fuel can wet the igniter, making it more difficult to light and can lead to carbon formations which will also make ignition more difficult.

Although the igniter is used for a very minute portion of the life of the engine, a great deal of care must be devoted to it such that it does not oxidize or melt in the course of the mission when it is not functioning. Typical igniters can fail instantaneously and without warning, which also requires special design considerations in anticipation of failure. The high voltages that are used to generate the spark can often find alternate paths in the circuit leading to the spark surface across which they can discharge and in such cases, the igniters can fail to provide an adequate spark for engine ignition. The high voltage transformers required to generate the arc are heavy and require heavy electrical cables and connectors. The sparks have trouble generating enough heat to vaporize cold fuel in cold conditions. Fuel must be in vapor form before it will ignite and burn. High velocity air, as may occur in altitude flameout situations can quench the spark out before it ignites significant fuel. The ignition process can interfere with electronic device functions through stray electromagnetic interference (EMI). Sparking systems have difficulty in maintaining a lit combustor under very low power or other unstable or transient mode of operation. Often, pilots might choose to leave the igniters on for an extended period of the mission to prevent flameout, such as during bad weather. Leaving the spark plugs on for the entire mission can lead to early igniter deterioration and failure.

Such conventional methods and systems have generally been considered satisfactory for their intended purpose. However, there is still a need in the art for systems and methods that allow for improved ignition. There also remains a need in the art for such systems and methods that are easy to make and use. This disclosure provides a solution for these needs.

SUMMARY OF THE INVENTION

A head assembly for an ignition system includes a head block and a plurality of igniters seated in the head block. The head block has an issue aperture, defines an issue axis, and is configured and adapted for sealably coupling with an igniter combustion chamber. The igniters are arranged about the issue aperture and include respective ignition members arranged obliquely with respect to the issue axis for igniting fuel exiting the issue aperture irrespective to orientation of the ignition system.

In certain embodiments, the ignition members can be skew with respect to the issue axis. The plurality of igniters can include a first igniter and second igniter, the first and second igniter being collectively operable for ignition and independently operable for ignition and flame detection. The plurality of igniters can include a first bank of three igniters and a second bank of three igniters, the igniters arranged about the issue aperture such that every other igniter is coupled to a first and second current source.

In accordance with certain embodiments, the head block can define a plurality of slots intersecting the issue aperture with a spider manifold disposed in the head block slots. The spider manifold can include an integral, radially extending fuel conduit fluidly coupled to the issue aperture. An oxidizer conduit can also be defined by the spider manifold, the oxidizer conduit being integral with the spider manifold and extending radially therefrom. The spider manifold can include an integral coolant conduit configured and adapted for supplying coolant to a face of the head block. An insulating body can couple to a face of the head body and fluidly couple to the coolant conduit.

In certain embodiments, the head assembly can include an insulating body seated on the head block with a plurality of interconnect apertures for electrically connecting the igniters to a voltage source. A conductive bridging body can have a plurality of conductive portions extending through a first plurality of interconnect apertures defined by the insulating body. The insulating body can be a first insulating body and the head assembly can include a second insulating body disposed against a surface of conductive bridging body. The conductive bridging body can be a first conductive bridging body and the head assembly can include a second conductive bridging body with a plurality of conductive portions extending through a second plurality of interconnect apertures defined by the insulating bodies. Electrical interconnects can extend radially inward from respective ends of the igniters to one of the first and second conductive bridging bodies.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 19 and FIG. 20 are top perspective views of the spider manifold coupled to the head block, showing relative placement of igniters with respect to the manifold, respectively;

FIG. 21 is a cross-sectional side elevation view of the igniter assembly of FIG. 8, showing cooling provisioning of the spider assembly;

DETAILED DESCRIPTION OF THE PREFERRED EMBODIMENTS

Figure 1:
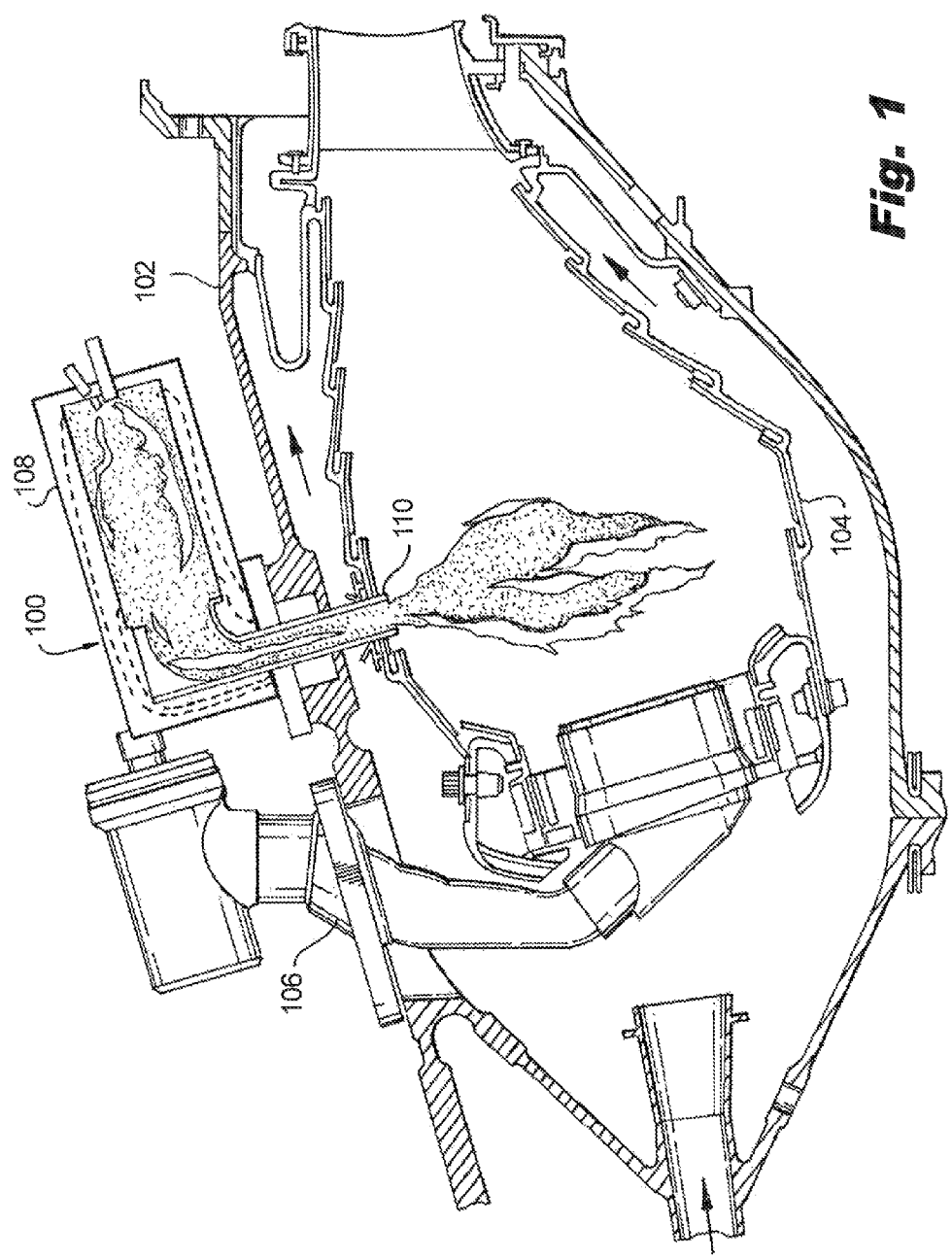
FIG. 1 is a schematic view of an exemplary embodiment of an ignition system, showing the housing of the ignition system mounted to the high-pressure casing and combustor of a gas turbine engine.

Reference will now be made to the drawings wherein like reference numerals identify similar structural features or aspects of the subject invention. For purposes of explanation and illustration, and not limitation, a partial view of an exemplary embodiment of an ignition system is shown in FIG. 1 and is designated generally by reference character 100. Other embodiments of ignition systems, or aspects thereof, are provided in FIGS. 2-24, as will be described. The systems and methods of the invention can be used, for example, to employ liquid fuel injection to improve the ignition performance of gas turbine engines. The systems and methods can be used in new engines, as well as to retrofit to existing engines to replace traditional ignition systems, for example.

In FIG. 1, ignition system 100 is shown mounted to a high-pressure casing 102 outboard of a combustor 104 of a gas turbine engine. Compressor discharge air enters the high-pressure casing on the left hand side of FIG. 1, and fills the interior of high-pressure casing 102. Some of the compressor discharge air passes into combustor 104 through the fuel injectors 106. Some of the compressor discharge air passes through the wall of combustor 104 as cooling air. Another smaller portion of the compressor discharge air can be routed into ignition system 100.

Ignition system 100 includes a housing 108 in the form of a pressure case defining an interior. Ignition system 100 also includes an exhaust outlet 110. Housing 108 is mounted to a combustor 104 to issue flame from exhaust outlet 110 into combustor 104 for ignition and flame stabilization within combustor 104.

Figure 2:
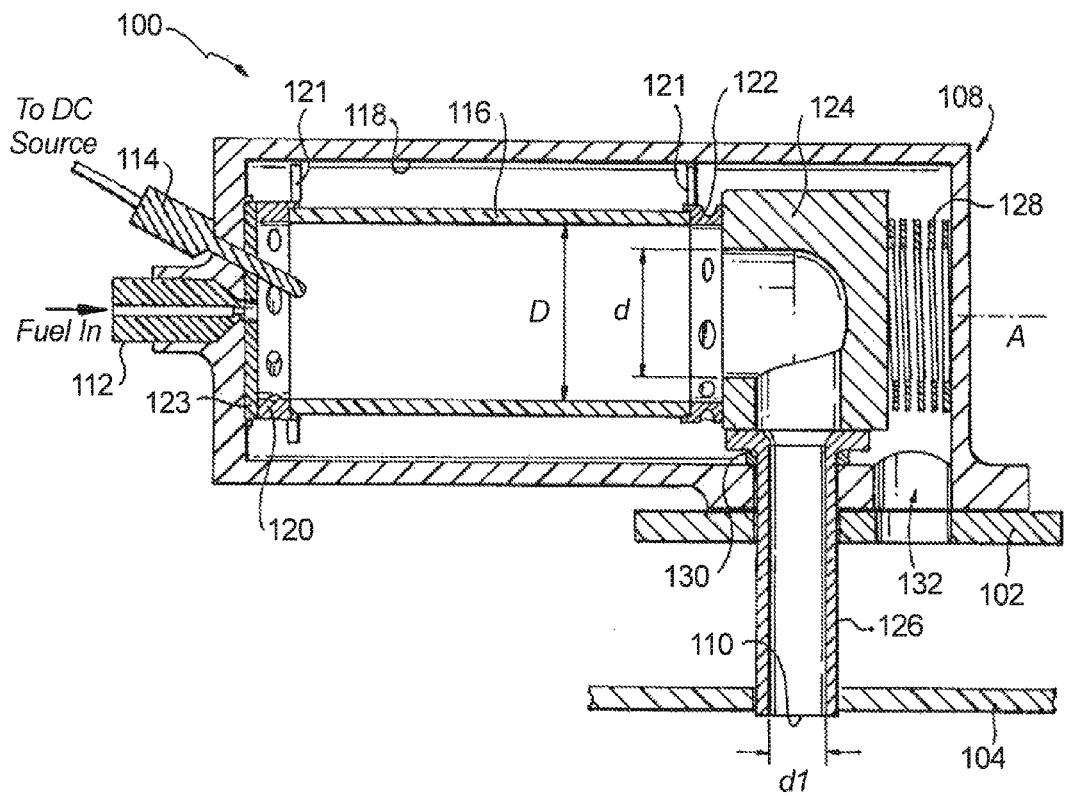
FIG. 2 is a cross-sectional side elevation view of the ignition system of FIG. 1, showing the combustion chamber of the ignition system.
Figure 3:
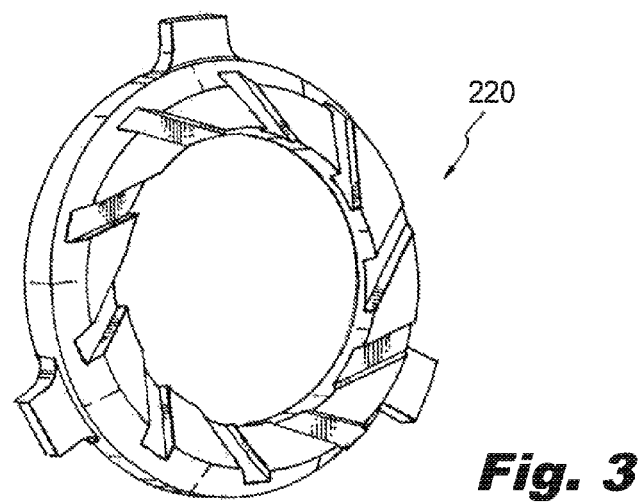
FIG. 3 is a perspective view of an exemplary embodiment of a swirler for use in an ignition system as shown in FIG. 2, showing slotted swirl passages.

Referring now to FIG. 2, a fuel injector 112 is mounted to housing 108 with an outlet of fuel injector 112 directed to issue a spray of fuel into the interior of housing 108. Fuel injector 112 is connected to a fuel line, as indicated schematically in FIG. 2. An igniter 114 in the form of a glow plug is mounted to housing 108 with an ignition point of igniter 114 proximate the outlet of fuel injector 112 for ignition within the interior of housing 108. As indicated schematically in FIG. 2, igniter 114 is connected to a DC power source. While a DC glow plug is preferred in certain applications, a conventional spark igniter located near the nozzle to provide intermittent ignition energy can be used in appropriate applications.

A cylindrical inner wall 116 is mounted in the interior of housing 108, spaced apart inward from housing 108 to define an air plenum 118 between inner wall 116 and housing 108. The inside of inner wall 116 defines a combustion chamber. A spaced apart pair of air swirlers 120 and 122 are provided. Swirler 120 is proximate a first end of inner wall 116. An inner wall of swirler 120 is proximate to fuel injector 112 and igniter 114. Swirler 122 is proximate the opposite end of inner wall 116. Air swirlers 120 and 122 provide fluid communication from air plenum 118 into the combustion chamber inside inner wall 116. Each of the air swirlers 120 and 122 is a radial swirler configured to meter and impart swirl onto a flow of air entering the combustion chamber. Cool swirling air clings to the inner surface of inner wall 116, and spreads both ways along longitudinal axis A. The two swirling flows engage in the interior of inner wall 116. This provides a stable, flame holding flow while providing cooling flow to the surface of inner wall 116, since the flame can be maintained without attaching to inner wall 116.

Inner wall 116 can be of ceramic or ceramic composite material, and swirlers 120 and 122 can be made of similar materials or metallic since they are cooled by the airflow into the combustion chamber. Those skilled in the art will readily appreciate that any other suitable high temperature materials can be used, and that these components can be formed separately or integrally as appropriate for given applications. Provision of two swirlers encourages some of the air to flow on the outer or backside of the combustion chamber, helping to cool wall 116 from the backside.

Figure 4:
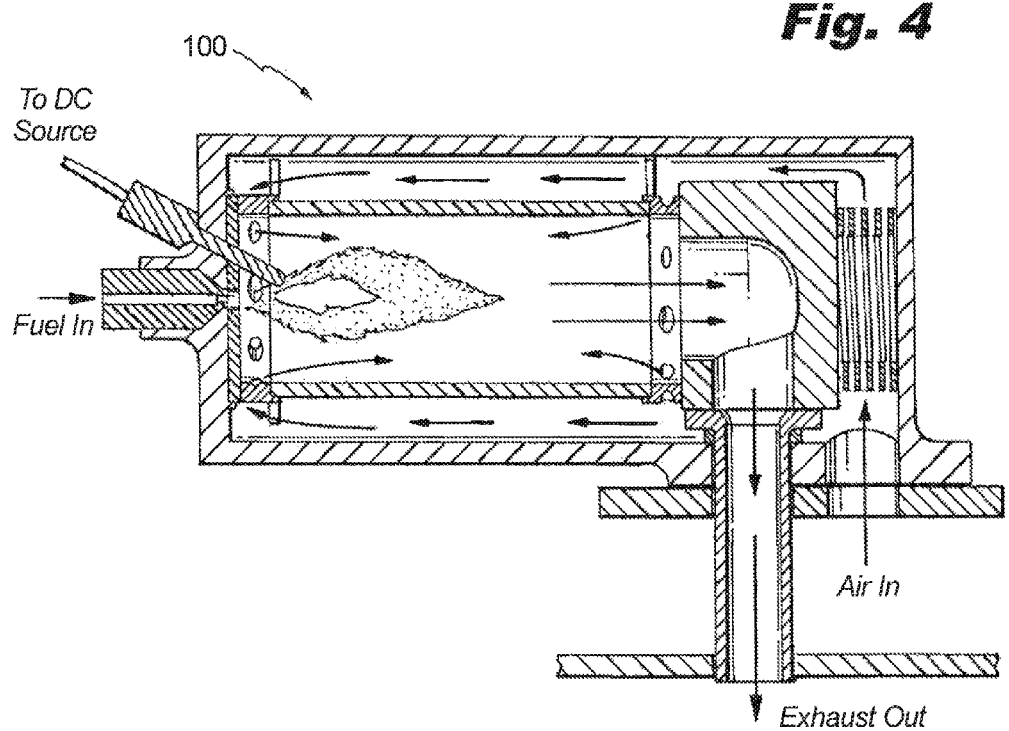
FIG. 4 is a cross-sectional side elevation view of the ignition system of FIG. 2, schematically showing the flow of air and fuel spray within the combustion chamber.

Swirlers 120 and 122 each have three or more integral tabs 121 as shown in FIG. 2 which centralize and support the cylindrical combustion chamber in outer housing 108. The airflow split through either of swirlers 120 and 122 can vary between about 25% to 75% of the total flow, and in certain applications a 50%-50% split is preferred. The swirl holes through swirlers 120 and 122, as shown in FIG. 2, are equally distributed around the respective swirler circumference and have trajectories offset from the swirler centerline to provide swirl to the flow therethrough. In certain applications it is preferable for swirlers 120 and 122 to be in a co-swirling configuration, however, those skilled in the art will readily appreciate that in suitable applications, counter-swirling configurations can also be used. While shown with cylindrical swirl holes in FIG. 2, slots can also be used as shown in swirler 220 shown in FIG. 3. A ceramic thermal barrier plate 123 is included between swirler 121 and housing 108. FIG. 4 schematically indicates the flow of air through system 100 with arrows, and schematically indicates the spray of fuel with stippling.

An elbow 124 is included with an elbow inlet operatively connected to receive combustion products from the combustion chamber along a longitudinal axis A. The inlet diameter d can be between about 25% and 75% of the combustion chamber diameter D. In certain applications, the inlet diameter d is preferably about 50% of the diameter D. Elbow 124 has an elbow outlet in fluid communication with the elbow inlet. The elbow outlet is aligned along a radial angle relative to longitudinal axis A. In system 100, the length of the combustion chamber is about twice the diameter D.

Figure 5:
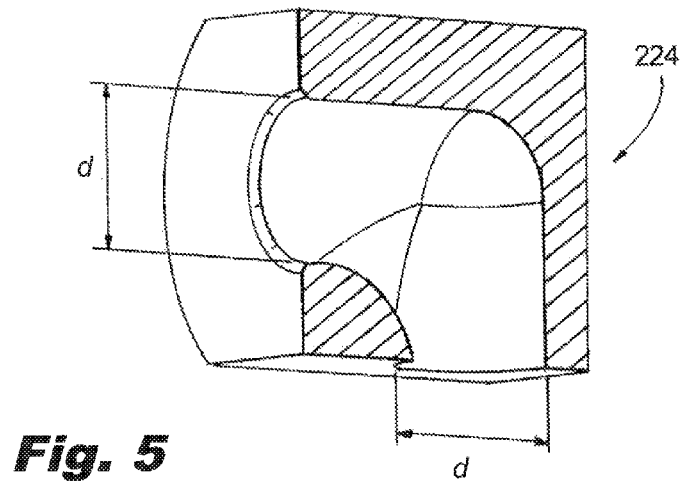
FIG. 5 is a cross-sectional perspective view of an exemplary embodiment of an elbow for use in an ignition system as shown in FIG. 2, showing inlet and outlet openings with the same diameter.

An exhaust tube 126 is connected in fluid communication with the outlet of elbow 124 for issuing combustion gases from exhaust outlet 110 of exhaust tube 126. The diameter d1 of the outlet passage through exhaust tube 126 can be in a range of about 0.5 to 0.6 times the diameter d of the elbow inlet. All of the wall surfaces in contact with combustion products can be made from high temperature materials which can be metallic, but can preferably be ceramic or ceramic composite materials in certain applications. While elbow 124 has an inlet diameter and an outlet diameter smaller than d, FIG. 5 shows another exemplary embodiment of an elbow 224 in which the inlet and outlet both have the same diameter d.

Figure 6:
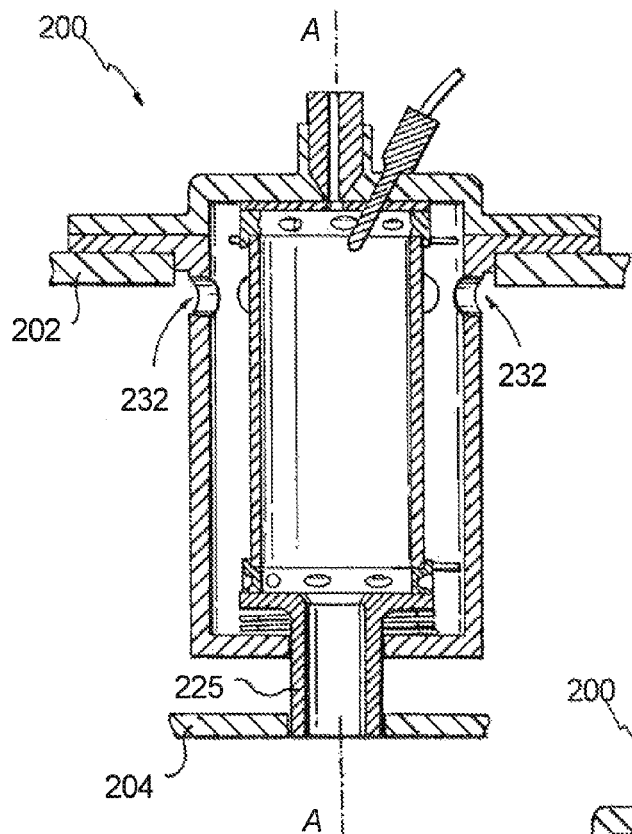
FIG. 6 is a cross-sectional side elevation view of another exemplary embodiment of an ignition system, showing an outlet axis aligned with the longitudinal axis of the combustion chamber.
Figure 7:
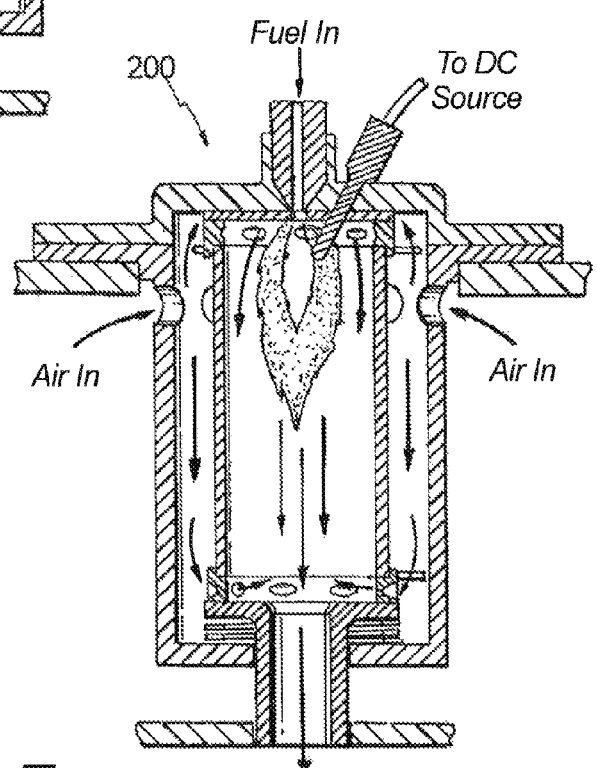
FIG. 7 is a cross-sectional side elevation view of the ignition system of FIG. 6, schematically showing the flow of air and fuel spray within the combustion chamber.

In FIG. 2, the elbow outlet is aligned along a radial angle relative to longitudinal axis A. However, any other suitable outlet alignment can be used. For example, FIG. 6 shows an ignition system 200 similar to ignition system 100, but with the axis of exhaust outlet 225 is aligned with the longitudinal axis A. Housing 208 is mounted to high-pressure casing 202 so that air will flow into housing 208 through radially oriented inlet 232, and outlet 225 is mounted to issue flame into combustor 204. FIG. 7 shows the airflow through system 200 schematically with arrows, and shows the spray of fuel into the combustion chamber of system 200 schematically with stippling.

In order to accommodate thermal expansion and contraction gradients, many of the components of ignition system 100 are in contact with but configured to slide relative to one another. Swirlers 120 and 122 are not fixed, but instead are centralized by outer tabs 121. Swirlers 120 and 122 seat the cylindrical flow elements in a sliding fashion to prevent or minimize any bending moments being transmitted to the cylinder. Exhaust tube 126 and elbow 124 are in contact but allowed to slide relative to one another for relative movement in the direction of longitudinal axis A. Exhaust tube 126 and housing 108 are in contact but allowed to slide relative engaged to one another for relative movement in the radial direction relative to longitudinal axis A.

An axial spring 128 biases elbow 124 toward inner wall 116 to keep elbow 124, inner wall 116, and swirlers 120 and 122 assembled to housing 108. A radially oriented spring 130 biases exhaust tube 126 toward elbow 124 to keep the inlet flange of exhaust tube 126 engaged to the outlet of elbow 124. It is contemplated that assembled in compression in this manner, housing 108, inner wall 116, elbow 124, and exhaust tube 126 can all be made of ceramic or ceramic composite materials. However, those skilled in the art will readily appreciate that any other suitable materials can be used without departing from the scope of this disclosure.

Housing 108 includes an air inlet 132 for issuing air for combustion into the interior of the housing 108. Air inlet 132 and exhaust outlet 110 are aligned to accommodate attachment of housing 108 to the walls of combustor 104 and high-pressure casing 102 to issue flame from exhaust outlet 110 into combustor 104 and to take in compressor discharge air through air inlet 132 from high-pressure casing 102 outboard of combustor 104. Ignition system 100 can be retrofitted onto a gas turbine engine to replace a traditional igniter by removing the traditional igniter and connecting air inlet 132 with a modified air passage of the high-pressure casing, and by connecting exhaust tube 126 to issue into the combustor.

Ignition systems as described above are based around a small combustion volume relative to the main combustor, and remote from the main combustion chamber. The housing, e.g., housing 108, is secured to the exterior of the engine to allow routine maintenance similar to conventional igniters. The orientation of the internal conduits containing high temperature combustion gases are such as to permit the axis of the main combustion element, e.g., the axial length of housing 108, to lay parallel to the engine axis, reducing the overall diameter of the engine envelope. The elbow, e.g., elbow 124, and exhaust tube whose axis is normal to the engine axis, allow the engagement with the engine combustor to be similar to conventional ignition devices. Those skilled in the art will recognize that any suitable modification of this orientation can also be used, for example to allow for improved ignition performance as needed for specific applications.

A relatively, small amount of metered air enters the combustion volume, e.g., inside housing 108, fed from the pressure of the main engine air supply. With the use of air swirlers, e.g. air swirler 120, to admit the air into the combustor of the ignition system, an air flow pattern is developed which enhances stable combustion while a small amount of fuel is injected in the air through an appropriate fuel injector, e.g., injector 112. The atomized fuel is ignited by the heat of an electric element or glow plug igniter, e.g., igniter 114, which is fed by low voltage DC electric current. The fuel ignites to produce a continuous stream of heat in the small combustor. The heat is of sufficient intensity to be able to ignite the fuel nozzle in the main combustor.

Once engine ignition has occurred, the electric element can be shut off. The flame in the small combustor can be left on continuously for the duration of the mission, supplying heat and radicals present in the combustion products to the main combustor at all times. Because the supply of fuel is small, the temperature produced by the ignition system does not overwhelm the temperature from the main fuel injectors when stable combustion is achieved. Only under very low power condition or during ignition processes does the energy from the ignition system rival the energy derived from the main combustor nozzles. As such, the impact from the ignition system is diminished at higher engine power and dominates at low engine power. This decoupled phasing and continuous duty helps the ignition system extend the flammability limits over that of a conventional combustor.

The hot gases from the ignition system can be projected deeply into the main combustor volume. This allows the spray pattern from the main nozzles to be optimized for durability and emissions compared to conventional situations where fuel must be sprayed towards the wall in order to approach a traditional igniter.

The continuous injection of heat into the main combustor allows for faster, higher quality main combustor ignition at lower, more adverse ignition conditions. Conventional fuel injectors require substantial fuel flow at low power to be able to form an atomized spray of sufficient quality to ignite. Aerated injectors require substantial air pressure to atomize fuel. At low starting speeds, airflows are low and the relatively high fuel flows are required for atomization produce relatively hot ignition situations when they finally ignite. This is exemplified by torching seen at the exhaust and large quantities of white smoke seen in cold weather starts. Within the ignition system, e.g., ignition system 100, the ignition of the nozzle, e.g., of injector 112, can be optimized for low flow conditions. The resulting flame is capable of igniting low quality sprays in the main combustor, speeding up engine ignition and reducing the overall temperature experienced during the main ignition sequence. This can prolong the life of the engine hot end components.

The ignition system can remain on continuously during a mission, protecting the main combustor from flame out. Its power can be controlled to vary with engine conditions through the fuel flow delivered to the ignition system. As such, it is capable of withstanding large excursions in engine conditions thereby assisting the main combustor.

The ignition system can utilize relatively low, DC power electric elements for ignition. These igniter devices are not prone to contamination from carbon deposits and are not prone to wetting or icing. They do not require high voltage cables and connectors, allowing for a lighter, more dependable delivery of ignition energy compared to higher voltage traditional igniters. They also emit significantly less electromagnetic interference to neighboring electronic equipment.

The size of the combustion chamber should be compact enough to easily be accommodated in an engine envelope and to utilize a small amount of fuel but be large enough to support a strong, stable flame. It has been found that using a cylindrical geometry with an approximate diameter of 1.5 inches (about 3.8 centimeters) can meet these objectives for certain typical applications.

Low emissions, lean burn type systems, present greater difficulty to ignition and flameout situations. The decoupled nature of the ignition systems described herein allow them to optimize the conditions for ignition within a confined volume away from the main nozzles allowing them to burn more cleanly while maintaining adequate ignition and relight capability.

An exemplary method of ignition for a combustor in a gas turbine engine includes initiating a fuel and airflow through the fuel injector of an ignition system as described above. The method also includes igniting the fuel and airflow with the igniter, e.g., igniter 112, and igniting a fuel and airflow in a combustor with the flame from the exhaust outlet of the ignition system. An exemplary method of combustion stabilization for a combustor in a gas turbine engine includes detecting a combustion instability in a combustor and issuing a flame from the exhaust outlet of an ignition system as described above into the combustor to stabilize combustion in the combustor. The method can further include increasing flame strength from the exhaust outlet of the ignition system in response to weak flame conditions in the combustor, and decreasing flame strength from the exhaust outlet of the ignition system in response to stable flame conditions in the combustor. While shown and described in the exemplary context of gas turbine engines, those skilled in the art will readily appreciate that ignition systems in accordance with this disclosure can be used in any other suitable application without departing from the scope of this disclosure.

Figure 8:
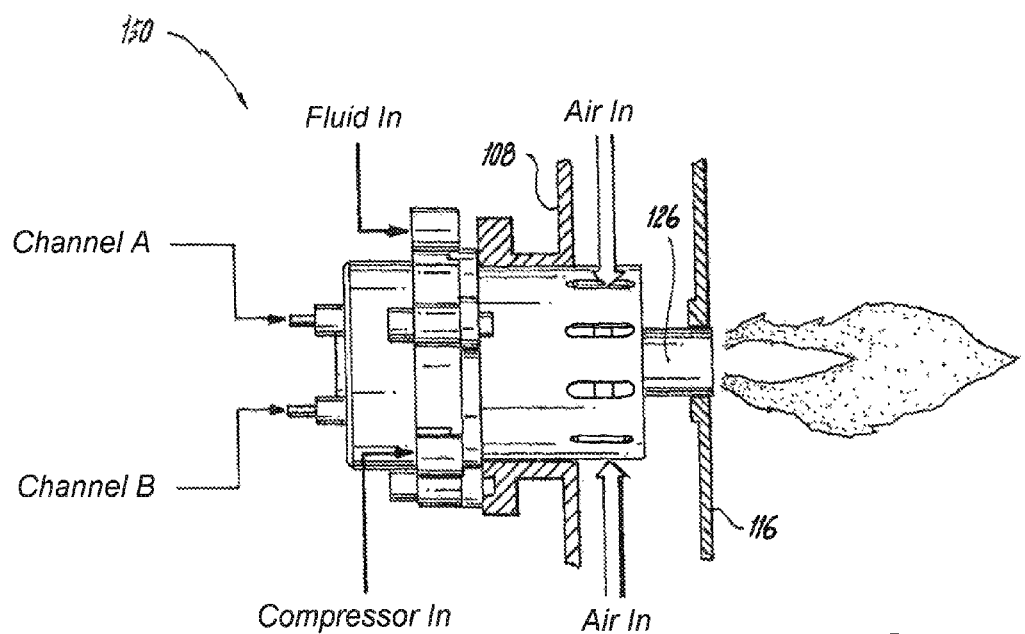
FIG. 8 is a side elevational view of an igniter for the ignition system of FIG. 1, showing fuel, air, and electrical provisioning of igniter.

With reference to FIG. 8, an igniter assembly 150 for ignition system 100 is shown. Igniter assembly 150 receives a compressor airflow and fuel flow, and mixes the flows within an igniter chamber. Electric current is provided to either or both a channel A and a channel B of igniter assembly 150 which are connected to a remote power source by suitable electrical cable.

Igniter assembly 150 is configured and adapted for integration into ignition system 100 for establishing and sustaining combustion within a gas turbine combustor. Igniter assembly 150 attaches externally to high-pressure combustor casing 108 externally, thereby providing access for maintenance or monitoring during operation. Exhaust tube 126 of igniter assembly 150 is similar in size to conventional igniters, potentially rendering igniter assembly 150 suitable for new engine applications, ease of 'design in' into derivatives of existing engines, and as a possible upgrade or retrofit of existing engines. Igniter assembly 150 protrudes through a floating seal into combustor casing 116, potentially accommodating geometry changes associated with startup and shutdown of the gas turbine combustor to which it is coupled.

Figure 17:
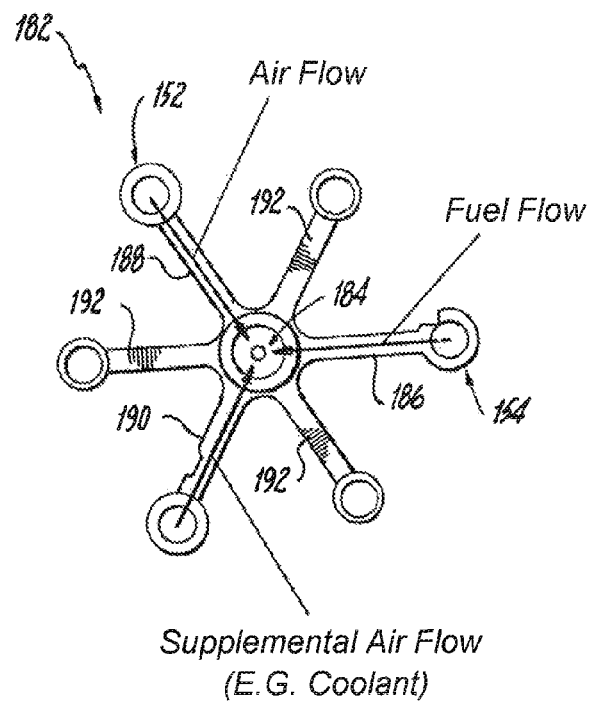
FIGS. 17 and 18 are top and bottom views of a spider manifold of the igniter assembly of FIG. 8, showing embodiments fed from opposite ends of the spider manifold.

Compressed air from the compressor section of a gas turbine is guided as a continuous air flow through an oxidizer conduit 152 (shown in FIG. 17) of igniter assembly 150 device for mixing with fuel provided through a fuel conduit 154 (also shown in FIG. 17). The mixture is ignited and ducted into the main combustion chamber to provide an ignition source to the main fuel flow within combustor. The device is decoupled from the main combustor, can be made to burn hot (i.e. at a higher temperature and/or higher fuel consumption rate) when power to the engine is reduced, and can be turned down to burn cooler (i.e. at a higher temperature and/or lower fuel consumption rate) when power from the engine is at its highest. A combustion volume of the ignition system is isolated from the main combustor and as such is under an environment suitable for combustion under different conditions than the main combustor. This enables ignition system 100 to ignite under conditions that may arise at very high altitude and which are more readily addressed through the combustion conditions within the ignition device than in the large combustor with conventional ignition. As will be appreciated by those skilled in the art, igniter assembly 100 provides adequate sealing against internal engine pressure through flanges and fasteners. Air, fuel, and electrical provisions are provided externally to ignition system which are protected thermally from the high temperatures of gas turbine combustor environs.

Figure 9:
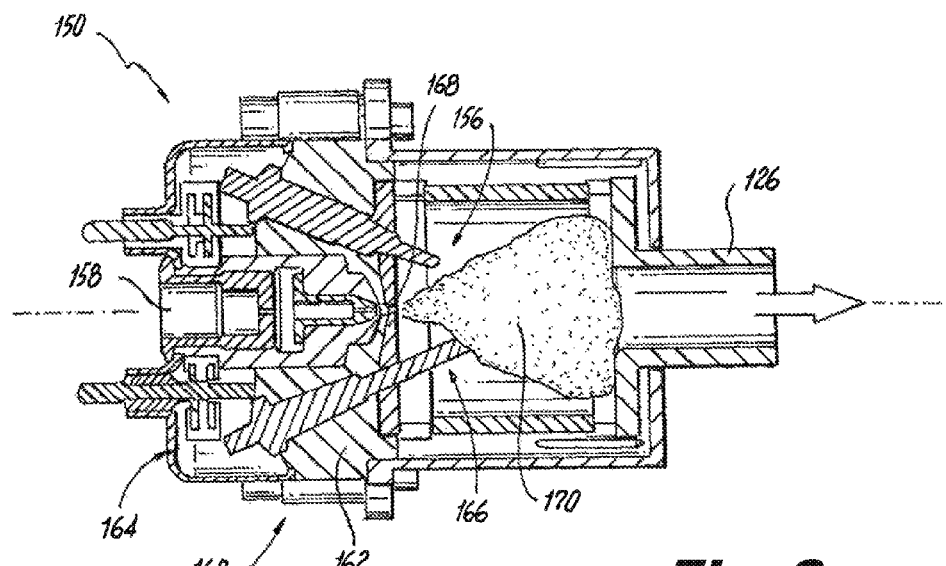
FIG. 9 is cross-section side of the igniter of FIG. 8, showing igniters, a head block, and thermal and electrical provisioning of the igniter.

With reference to FIG. 9, igniter assembly 150 is shown in a cross-sectional side elevation view. An interior of igniter assembly 150 defines a combustion chamber 156 configured for containing the combustion products and exhausting the combustion products into the main combustor chamber. A head assembly 160 is configured for sealing the interior of the combustion chamber and is provisioned for seating fuel, air and ignition structures. A head block 162 with a cover 164 provides threaded connections for attachments to a power source, i.e. channel A and channel B. These connections engage external metallic shields of the respective power cables for purposes of providing a path to the system electrical ground. Cover 164 grounds igniters 166, e.g. glow plugs, through direct contact with head block 162 through a fastener 158. In embodiments, a separate ground wire and ground wire fastener performs this function. As will be appreciated by those skilled in the art, grounding can be through a ground wire attached between the block and the cap (not shown for clarity purposes).

A fuel nozzle and an air nozzle seat in head block 162 in alignment with an issue aperture 168 defined in head block 162. Head block 162 defines an issue axis 170 extending through issue aperture 168 and about which igniters 166 are disposed. Igniters 166 are arranged obliquely with respect to an issue axis 170 and about issue axis 170 such that, irrespective of system orientation, ignition flame issues from igniter assembly 150 into the combustion of chamber of gas turbine. This provides for stabilization of a flame within the combustor by providing concentrated thermal power to fuel issuing from head block 162 independent of gravitational effects due to system orientation. Any orientation of the igniter assembly 150 will therefore provide opportunity for fuel to approach at least one hot igniter member 174. Igniters 166 are further arranged to be far enough from issue axis 170 such that fuel issuing from issue aperture 168 does not wet each igniter member sufficiently to cool the igniter members sufficiently to potentially prevent ignition, yet is close enough to issue axis 170 such that adequate ignition and flame stabilization is realized.

In the illustrated embodiment, igniters 166 are disposed in an offset conical pattern which allow igniter members 166 elements to approach issue axis 170 at a desired distal (i.e. an optimal distance) for example, without interfering or colliding with one another. Igniter members 166 are also arranged to be independent of gravitation forces which may be imposed on low flowing fuel streams biasing the stream in one direction.

Figure 10:
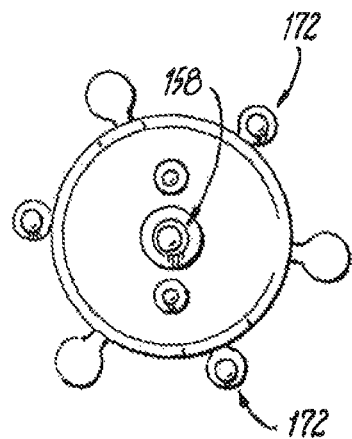
FIG. 10 is a plan view of a top end of the igniter assembly of FIG. 8, showing the fastener arrangement of the assembly.

With reference to FIG. 10, an end of igniter assembly 150 is shown. Cover 164 shields the internal components located under the cover and provides support for electrical connectors for channel A and channel B. Separate power input cables for channel A and channel B connect to the electrical connectors disposed on cover 164. Fastener 158 is centrally located to fasten cover 164 to head block 162, and provide an electrical ground path to ground through cover 164 to metal sheaths of cables coupled to the electrical connectors. Head block fasteners 172, separately arranged about the periphery of head block 162, couple head block 1562 to housing 108 (shown in FIG. 8). This provided for ease of service as igniters 166 are accessible for replacement without removing head block 162 from housing 108.

Figure 11:
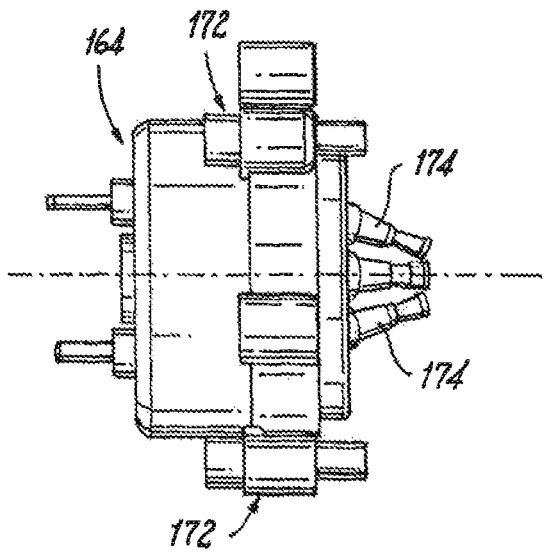
FIG. 11 is side view of the igniter assembly of FIG. 8, showing the cover and electrical channel connections of the assembly.
Figure 12:
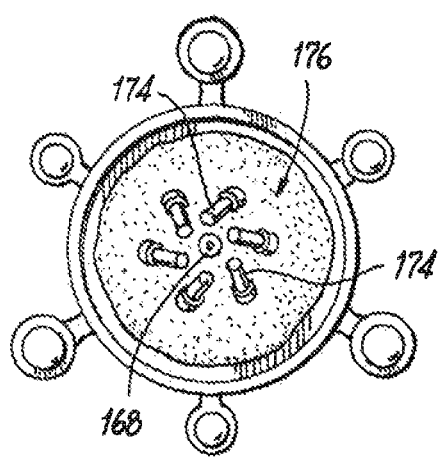
FIG. 12 is a plan view of a bottom end of the igniter assembly of FIG. 8, showing the off axis, skew arrangement of the igniter members of the assembly.

With reference to FIG. 11 and FIG. 12, igniter assembly 150 is shown in a side elevational view. Igniter assembly 150 includes six igniters that are concentrically arranged such that respective igniter members 166 are skew with respect to issue axis 170. This allows igniters 166 to ignite spray issuing from issue aperture 168 but not be cooled by the spray or to interfere with the spray during operation. As shown in FIG. 12, igniter assembly further includes a thermal barrier plate 176 arranged adjacent (or on) a face oriented combustion chamber 156 for shielding components from heat generated within combustion chamber 156. Insulating plate 176 can be constructed from a ceramic material, for example.

Figure 13:
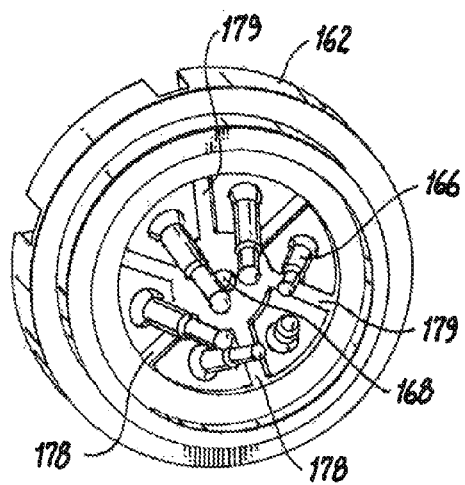
FIG. 13 is a perspective view of the head block of the igniter assembly of FIG. 8, showing the coolant channels disposed on the face of the head block.
Figure 14:
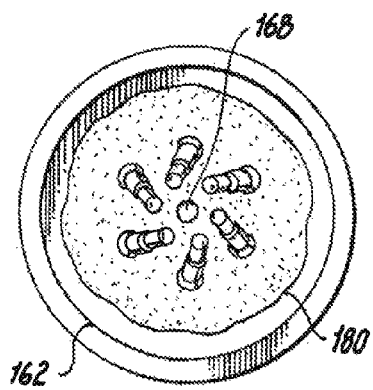
FIG. 14 is a plan view of the bottom end of the head block of FIG. 13, showing the lunate cutouts for coolant defined about the periphery of an insulating plate disposed on a face of the head block.

With reference to FIG. 13, head block 162 is shown with igniters 166 installed. Head block 162 defines a plurality of coolant grooves 178 defined in a surface head block 162 facing combustion chamber 156. Coolant grooves 178 are fluidly coupled with issue aperture 168 so as to receive and distribute a flow of coolant across the face of head block 162, such as with a baffle structure. With reference to FIG. 14, insulating plate 176 defines a plurality of circumferential recesses 180 configured to provide an inlet for the coolant flow radially offset from issue aperture 168. Coolant grooves 178 and insulating 176 cooperate to direct coolant issuing from issue aperture 168 radially, across the face of head block 162, thereby cooling head block 162. This reduces the temperature of head block 162 in relation to the combustion process. As illustrated in FIG. 13, coolant grooves 178 define radial channels 179. As will be appreciated by those skilled in the art, coolant channels 179 can have other geometries and remain within the scope of the present disclosure.

Figure 15:
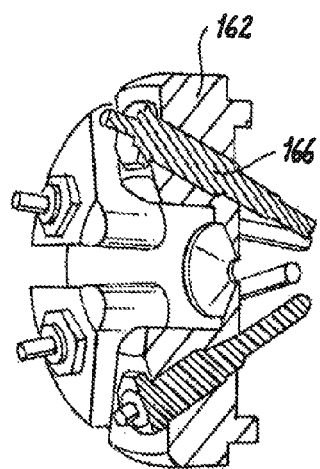
FIG. 15 is a cross-sectional perspective view of the head block of FIG. 13, showing the engagement of igniters within the head block.
Figure 16:
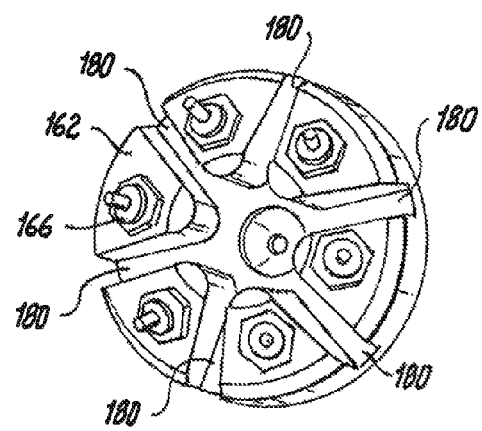
FIG. 16 is a perspective end view of the head block of FIG. 13, showing grooves defined within the head block for receiving a spider manifold.

With reference to FIG. 15 and FIG. 16, head block 162 is shown in backside perspective and cross-section perspective views. To enable the conical arrangement of igniter 166 (e.g. ceramic glow plugs) about issue aperture 168, and to allow the use of adequate heat shielding on the bulkhead face, and permit the replacement of the plugs when they fail, the plugs are threadably received within head block 162. Ceramic elements of the igniters 166 are brazed into metallic jackets which form threaded connectors and which electrically ground the elements to the main block. The interface between each respective metallic jackets and head block 162 is sufficiently large to permit heat to be extracted from the ceramic/metallic braze interface region into head block 162 to prevent the braze joint from thermally degrading.

Head block 162 seals an end of combustion chamber 156 (shown in FIG. 8). Head block 162 defines flanges and is of suitable thickness for sealing combustion chamber 156. As shown, head block 162 defines a plurality of grooves 180 for securing head block 162 of the torch body with fasteners using a spider manifold 182 (shown in FIG. 17). In embodiments, grooves 180 are oversized with respect to spider manifold 182, thereby reducing heat transfer between head block 162 and spider manifold 182. Igniters 166 engage head block 162 with suitable threads for sealing combustion gases houses within combustion chamber 156.

Igniters 166, six shown in the illustrated exemplary embodiment, are independently operable in two separate banks of three, e.g. as a 'channel A' and a 'channel B'. As will be appreciated by those skilled in the art, this provides for operation of one bank as flame detector while the other is used as heating elements for ignition. For example, in operational circumstances where ignition is extremely difficult due to cold fuel conditions, all plugs can be selected to be energized to provide a very hot concentrated zone which can vaporize and ignite the fuel. Both banks can also be cooperatively operated, such as when additional heat is necessary to warm fuel entering combustion chamber 156, such as during operation at extreme altitude for example. Similarly, igniters in a powered off state can develop a carbon coating during operation while de-energized. Periodically energizing the resting bank of igniters will remove carbon without affecting ignition capability. Use of igniters having a solid ceramic construction (instead of conventional glow plugs with a metallic filament) which can withstand very high operating temperatures for extended periods of time without deteriorating provides increased operational reliability.

With reference to FIG. 17, spider manifold 182 is shown from the perspective of head block 162. Spider manifold 182 includes a centrally arranged nozzle chamber 184 including issue aperture 168. A plurality of arms extend radially from nozzle chamber 184, one arm including a fuel conduit 186, one arm including an oxidizer conduit 188, one arm including a supplemental air conduit 190, and in at least two arms forming coupling arms 192. Fuel conduit 186 is configured and adapted for connection to a fuel source on one end, and is fluidly coupled to nozzle chamber 184 on its other end. Oxidizer conduit 188 is fluidly coupled to an oxidizer source, e.g. air, on one end, and fluid couples to nozzle chamber 184 on its other end. Coupling arms 192 structurally couple to nozzle chamber 184 on one end, and are configured and adapted to receive fasteners for coupling spider manifold 182 to housing 108, such as by receiving a fastener at a respective end.

Figure 18:
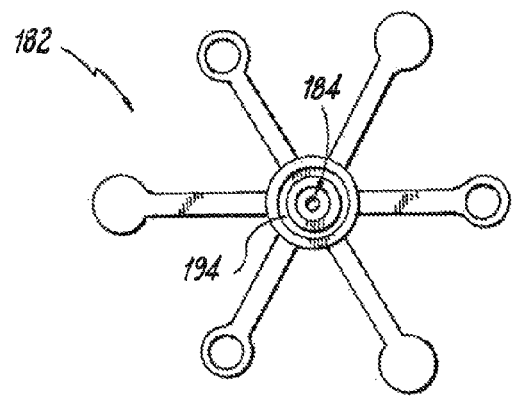

With reference to FIG. 18, an opposite side of spider manifold 182 is shown. Supplemental air conduit 190 structurally couples to nozzle chamber 184 and is fluidly coupled to an annular coolant channel separated from nozzle chamber 184 by a baffle 194. This allows for coolant to be routed independently to portions of spider manifold 182 requiring cooling. Spider manifold 182 provides a fuel connector and fuel gallery for the device, external air connectors and air galleries for the device, and a central nozzle chamber 184 configured and adapted to seat a fuel atomization element (shown in FIG. 21). It further provides a centrally arranged fuel air injection location arranged at the center of the glow plug array that allows for the skew orientation described above for igniter members 166 (and concentration of glow plugs very near the low flow fuel injection orifice). It also provides sealing to prevent leakage of high-pressure engine air and conduit for conveying supplementary cooling flow into the central region of igniter assembly 150.

With reference to FIG. 19 and FIG. 20, spider manifold 182 is shown attached to head block 162. Fuel conduit 186, oxidizer conduit 188, supplemental air conduit 190, and coupling arms 192 are received within respective grooves 180 defined within head block 162. External fluid connections (e.g. fuel, oxidizer, coolant) required to be channeled to the center of spider manifold 182 are distributed around the periphery of head block 162. Connections with respective conduits can be made from below, i.e. from the combustor side of spider manifold 182 as shown in FIG. 19, or from the top side, i.e. from opposite the combustor side of spider manifold 182 as shown in FIG. 20, as suitable for a given application. As will be appreciated by those skilled in the art, different numbers of conduits can be provided as suitable for a given application, such as to supply greater volume of fuel, air or coolant for example.

With reference to FIG. 21, igniter assembly 150 is shown. Fuel conduit 186 conveys fuel to the nozzle chamber 184. Fuel conduit 186 (as well as oxidizer conduit 188, supplemental conduit 190 and coupling arms 192) engages head block 162 so as to reduce heat transfer between the elements. This is done by selectively oversizing grooves 180 such that voids 196 and seals 194 are formed between spider manifold 180 and head block 162 along respective lengths of fuel conduit 186, oxidizer conduit 188, supplemental air conduit 190, and coupling arms 192.

Oxidizer, e.g. air, is admitted into nozzle chamber 184 from oxidizer conduit 188 and has oxidizer inlet arranged above a fuel distribution element. Issue aperture 168 is relatively small, and in embodiments is between about 0.05 inches (1.27 millimeters) to about 0.07 inches (1.78 millimeters), thereby limiting backflow of combustion gases from combustion chamber 156 into head block 162. Head block 162 additionally includes insulating plate 176 which shields head block 162 from combustion environment. As described above, cooling air to be admitted behind the ceramic plate to further limit the amount of heat that can flow into the bulkhead and then into the fuel conveying manifold.

Figure 22A:
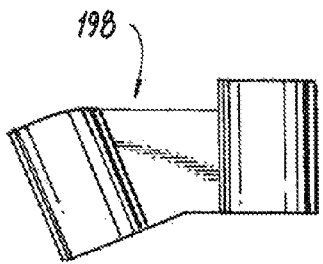
FIGS. 22A-22D are side and perspective elevation views of the igniter assembly of FIG. 8, showing the electrical interconnects disposed within the assembly, respectively.
Figure 22B:
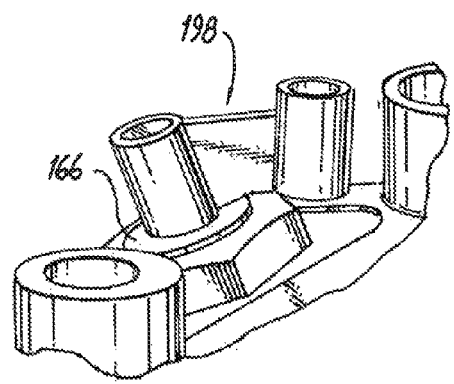
Figure 22C:
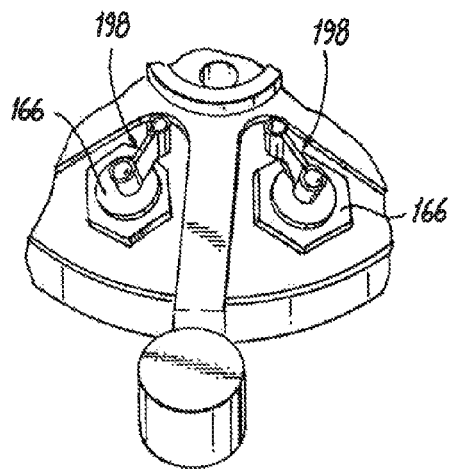
Figure 22D:
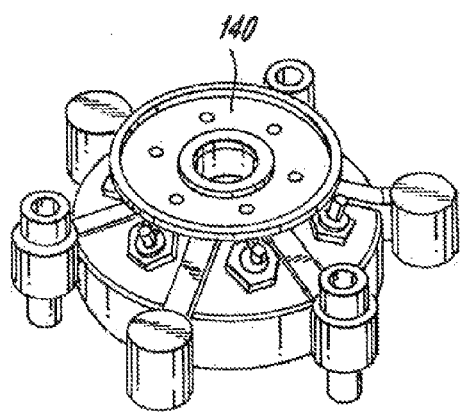

With reference to FIGS. 22A-22D, electrical interconnects 198 are shown. With reference to FIG. 22A, electrical interconnect includes an igniter socket, a channel socket, and bridging element spanning between the igniter and channel sockets. With reference to FIG. 22B, the igniter socket seats on an end of igniter 166 and is oriented, e.g. clocked radially about igniter 166, so as to align with first insulating body 140 (shown in FIG. 22D) and second insulating plate 142 (shown in FIG. 23C), and electrically connects with one of first feed body 144 (shown in FIG. 23A) and second feed body 146. With reference to FIG. 22D, first insulating body connects to igniter assembly 150 so as to electrically insulate each of electrical interconnects 198 from one another, and is constructed from a temperature resistant insulating material such as ceramic for example.

Figure 23A:
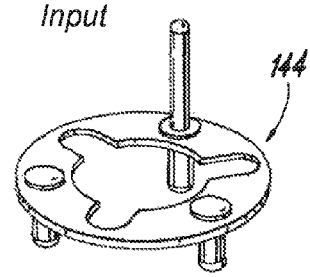
FIGS. 23A-23C are perspective views of a first channel set of electrical interconnects for the assembly of FIG. 8, respectively showing electrical connections for a first bank of igniters.
Figure 23B:
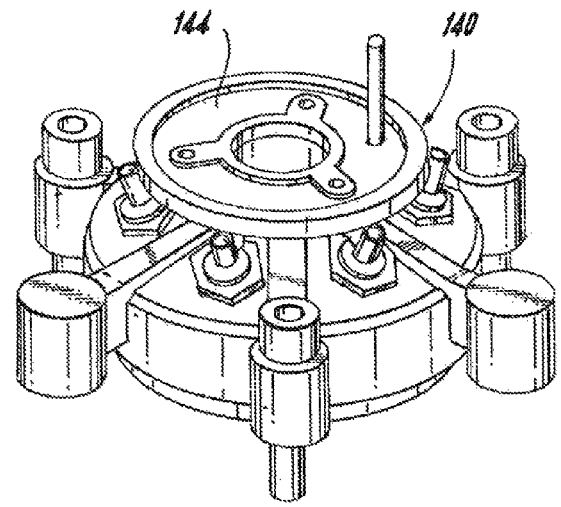
Figure 23C:
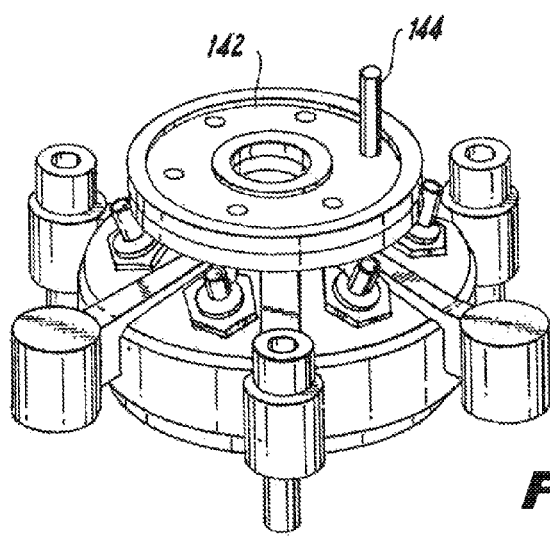

With reference to FIGS. 23A-23C, first feed body 144 is shown. As shown in FIG. 23A, first feed body 144 includes an input prong, a plurality of output prongs, and a circumferentially extending conductive body coupling the output prongs to the input prong. As shown in FIG. 23B, first feed body 140 seats on first insulating body 140 and electrically connects to a plurality of the electrical interconnects 198. This groups igniters into a bank, and in the illustrated embodiment, groups every other igniter 166 in the set of six illustrated into a first bank of three igniters. As shown in FIG. 23C, second insulating body seats over first feed body 144, and is similar in construction to first insulating body 140. The channel 'A' input of the first feed body extends through first insulating body, thereby providing electrical connection to the first bank of igniters.

Figure 24A:
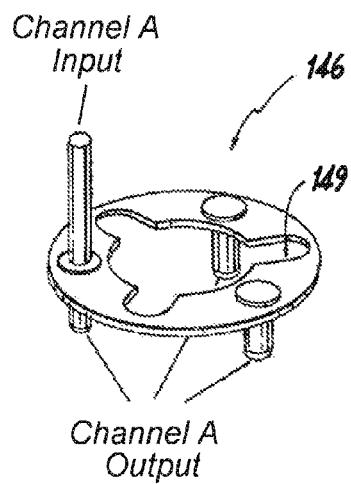
FIGS. 24A-24C are perspective views of a first channel interconnect of the igniter assembly of FIG. 8, showing electrical connections for a second bank of igniters, respectively.
Figure 24B:
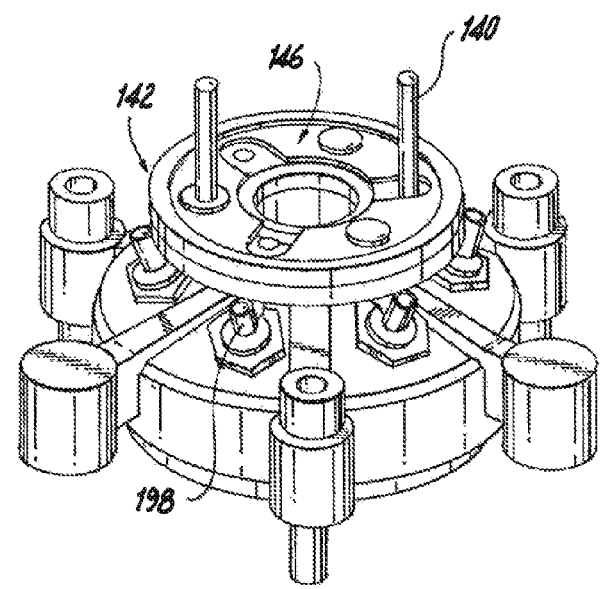
Figure 24C:
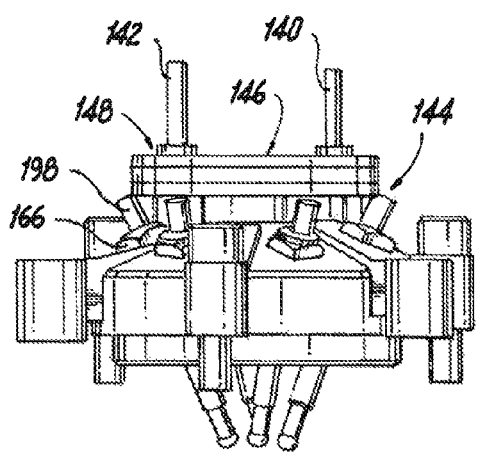

With reference to FIGS. 24A-24C, a second feed body 146 is shown. Second feed body 146 is similar in construction to first feed body 144, and additionally include a lunate cutout 149. As shown in FIG. 24B, second feed body 146 seats on second insulating body 142 such that the channel A input of first feed body 144 extends through second feed body 146 in electrical isolation therefrom. As shown in FIG. 24C, third insulating body 148 seats over second insulating body 142 and second feed body 146, and in cooperation with flanges disposed about peripheries of first insulating body 140 and second insulating body 142, presents an insulated stack to cover 164. This enables cover 164 to mechanically fix the insulating bodies and conductive bodies in place and act as a conductive path to ground as described above.

The methods and systems of the present invention, as described above and shown in the drawings, provide for ignition with superior properties including easier startup, continuous operation, and enhanced reliability. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A head assembly for an ignition system, comprising:
   a head block with an issue aperture and defining an issue axis, the head block being configured and adapted for sealably coupling with an igniter combustion chamber; and
   a plurality of igniters seated in the head block and arranged about the issue aperture, wherein each of the igniters has an ignition member arranged obliquely with respect to the issue axis,
   wherein the head block defines a plurality of slots intersecting the issue aperture and further comprising a spider manifold disposed in the plurality of slots defined by the head block.

2. A head assembly as recited in claim 1, wherein each of the ignition members are skew with respect to the issue axis.

3. A head assembly as recited in claim 1, wherein the plurality of igniters includes a first igniter and second igniter, the first and second igniter collectively operable and independently operable.

4. A head assembly as recited in claim 3, further including a first bank of three igniters and a second bank of three igniters, the igniters arranged about the issue aperture.

5. A head assembly as recited in claim 1, wherein the spider manifold defines an integral, radially extending fuel conduit fluidly coupled to the issue aperture.

6. A head assembly as recited in claim 1, wherein the spider manifold defines an integral, radially extending oxidizer conduit fluidly coupled to the issue aperture.

7. A head assembly as recited in claim 1, wherein the spider manifold includes an integral coolant conduit configured and adapted for supplying coolant to a face of the head block.

8. A head assembly as recited in claim 7, an insulating body coupled to a face of the head block and fluidly coupled to the coolant conduit.

9. A head assembly as recited in claim 1, further including an insulating body seated on the head block and having a plurality of interconnect apertures for electrically connecting the igniters to a voltage source.

10. A head assembly as recited in claim 9, further including a conductive bridging body having a plurality of conductive portions.

11. A head assembly as recited in claim 9, wherein the insulating body is a first insulating body and further including a second insulating body disposed against a surface of the conductive bridging body.

12. A head assembly as recited in claim 11, wherein the conductive bridging body is a first conductive bridging body and further including a second conductive bridging body having a plurality of conductive portions extending through a second plurality of interconnect apertures defined by the insulating bodies.

13. A head assembly as recited in claim 1, further including an insulating plate disposed adjacent to an interior surface of the head block, wherein the insulating plate defines a central issue aperture and a plurality of radially arranged igniter apertures configured for receiving igniters in an off axis, skew arrangement.

14. A head assembly as recited in claim 13, wherein a surface of the head block opposite the insulating plate defines a plurality of cooling channels for flowing coolant between the head block and insulating block.

15. A head assembly as recited in claim 1, further including a cover coupled to the head block by a fastener, the fastener providing a ground reference terminal for the igniters.

16. A head assembly for an ignition system, comprising:
    a head block with an issue aperture and defining an issue axis, the head block being configured and adapted for sealably coupling with an igniter combustion chamber;
    a plurality of igniters seated in the head block and arranged about the issue aperture, wherein each of the igniters has an ignition member arranged obliquely with respect to the issue axis;
    a first conductive bridging body having a plurality of conductive portions seated on the head block;
    a second conductive bridging body having a plurality of conductive portions seated on the head block; and
    a plurality of electrical interconnects extending radially inward from ends of the igniters to one of the first and second conductive bridging bodies.

* * * * *